United States Patent [19]
Whitener

[11] Patent Number: 5,978,317
[45] Date of Patent: Nov. 2, 1999

[54] SEISMIC ACQUISITION SYSTEM AND METHOD UTILIZING BURIED GEOPHONES

[75] Inventor: Wayne Whitener, Pottsboro, Tex.

[73] Assignee: TGC Industries, Inc., Plano, Tex.

[21] Appl. No.: 08/933,280

[22] Filed: Sep. 18, 1997

[51] Int. Cl.[6] .................................................. H04R 15/00
[52] U.S. Cl. .......................................... 367/178; 181/122
[58] Field of Search .............................. 181/122; 367/13, 367/77, 37, 178; 340/10, 7 R; 174/52 R

[56] References Cited

U.S. PATENT DOCUMENTS

| | | | |
|---|---|---|---|
| 2,783,298 | 2/1957 | Brown, et al. . | |
| 3,932,834 | 1/1976 | Sutherland | 340/7 R |
| 4,092,628 | 5/1978 | Hall, Jr. | 340/10 |
| 4,438,292 | 3/1984 | Woodall | 174/52 |
| 4,583,207 | 4/1986 | Greer, Jr. . | |
| 4,764,908 | 8/1988 | Greer, Jr. . | |
| 5,007,031 | 4/1991 | Erich, Jr. . | |
| 5,014,813 | 5/1991 | Fussell | 181/122 |
| 5,124,956 | 6/1992 | Rice et al. . | |

Primary Examiner—John Barlow
Assistant Examiner—Jonathan R. Spivey
Attorney, Agent, or Firm—Bush, Riddle & Jackson

[57] ABSTRACT

A seismic acquisition system and method utilizing an array of buried geophones storage devices or containers (16) each having a geophone (40) which may be permanently stored in container (16) in a fluid tight relation. The storage container (16) includes a base (26), a tubular cylindrical body (28), and an upper cap (32) threaded onto body (28). The storage container (16) is shown in FIG. 2 in an operable relation and in FIG. 3 with geophone (40), lead (52), and connector (54) in a stored relation. In the event an additional survey or shoot is conducted at a later time, such as a one year time interval, the buried storage containers (16) are utilized upon removal of outer caps (32) and withdrawing of geophone connectors (54) for connection in a mating relation to cable connectors (20).

9 Claims, 1 Drawing Sheet

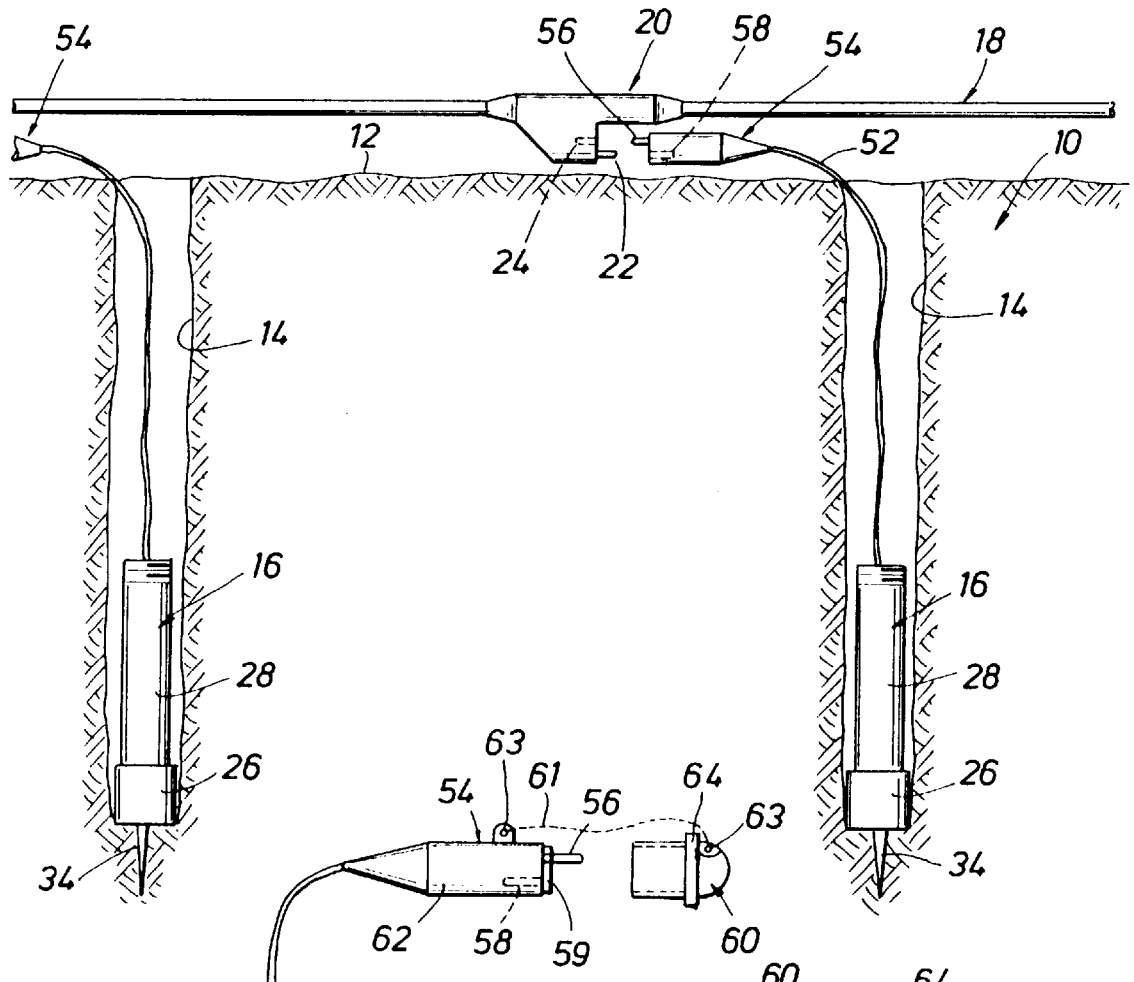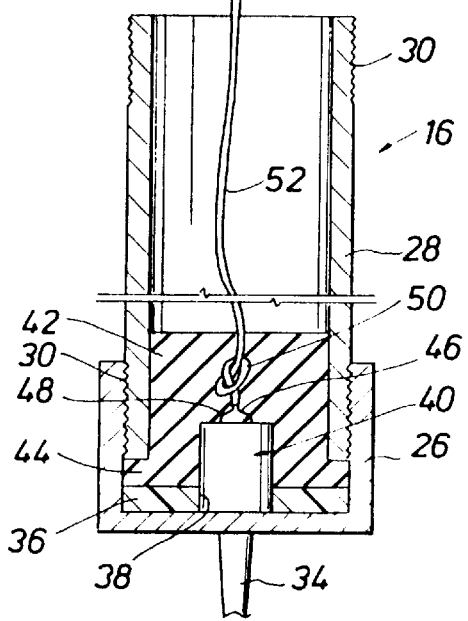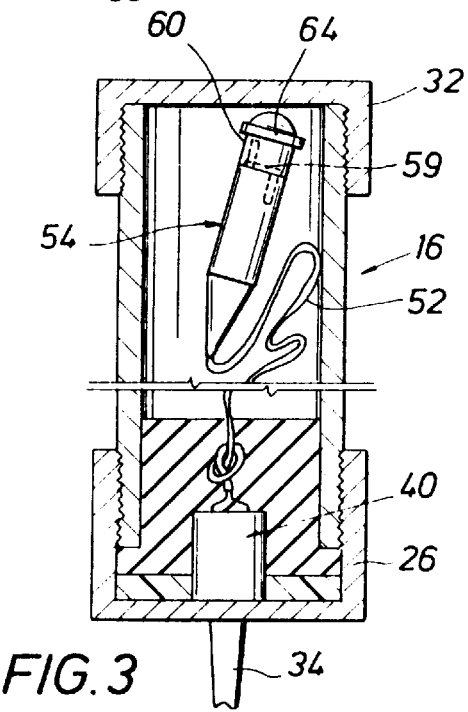

SEISMIC ACQUISITION SYSTEM AND METHOD UTILIZING BURIED GEOPHONES

FIELD OF THE INVENTION

This invention relates to a seismic acquisition system and method utilizing buried geophones, and more particularly to such a system in which each geophone is mounted in an outer tubular housing buried in the earth and adapted to store the geophone for subsequent utilization at a later time.

BACKGROUND OF THE INVENTION

In the search for petroleum and other valuable resources, it has become the practice to transmit a seismic signal into the earth from one or more source points near the surface of the earth. The reflected and/or refracted energy returning from within the earth to a receiver location is detected by a geophone or other seismometer and raw seismic data are recorded. The raw seismic data are mathematically processed and then interpreted to provide an indication of the structure of the underlying strata.

Geophones are disposed in accordance with the requirements of a particular survey at spaced intervals for reception of seismic source signals as they arrive through the air, directly from the source or sources along the surface of the ground and as refracted and reflected by the lithological character of the subsurface. The received data in the form of acoustical energy or elastic motion is converted to corresponding electrical signals by the element or elements in each geophone for transmission and recording with related data from the sources and from other geophones. Finally, the data is processed and interpreted or analyzed to yield information about the subsurface character of the lithology. Typically, this is done to determine if there might by hydrocarbon deposits and, if so, at what depths and in what quantity.

Although surveys vary tremendously in their requirements, it is not uncommon for a particular survey to require dozens of geophones. Further, after the readings are recorded for a first location, the geophones are located for taking numerous subsequent readings.

Seismic acquisition systems today oftentimes utilize time as a factor in so called "4-d" seismic acquisition for ascertaining any movement of petrolites or hydrocarbons. In such a seismic acquisition, the same spread configuration of the geophones buried in the earth is surveyed at different time intervals. Two or more surveys at time intervals of several months or a few years are made in order to ascertain any migration of hydrocarbons. For such surveys, it is extremely critical for accurate results that the positioning of the geophones and energy sources are at or very near the same position each time data is acquired by a survey. It is very difficult to position the geophones at the same location if the geophones are removed after each survey particularly when several months or years occur between subsequent surveys.

It is an object of the present invention to provide a seismic acquisition system for multiple surveys or shoots separated by predetermined time intervals and utilizing geophones which are positioned in the same position for all of the surveys.

A further object of the invention is to provide a geophone storage structure buried in the earth for storing a geophone therein so that the geophone may be utilized at a fixed earth position for multiple surveys taken over long time periods.

SUMMARY OF THE INVENTION

The present invention is directed to a seismic acquisition system particularly adapted for utilization with multiple surveys or "shootings" conducted at spaced time periods, such as time intervals of several months or a few years, for example. It is essential for accurate testing and results that the geophones or energy sources be positioned at the same location for the multiple survey so that accurate comparisons of the multiple surveys or shoots may be made. For that purpose the present invention includes a generally permanent buried storage container or device for each geophone so that the geophones may be stored at the same location for subsequent surveys. The storage container comprises an outer tubular housing receiving the geophone, a connector for releasably connecting the geophone to a seismic cable and a lead between the geophone and connector. A removable cap on the tubular housing is connected to the housing when the geophone is in a stored position with the connector and lead from the geophone to the connector. Upon removal of the cap for utilization of the stored geophone at a later time period, the connector is withdrawn from the buried housing and connected to the seismic cable at a surface location. The connector has an upper removable cover to protect the conductor ends of the electrical leads in a stored position. The cover is removed for connection of the geophone connector to the seismic cable.

Other objects, features, and advantages of the invention will become more apparent upon referring to the following specification and drawings.

BRIEF DESCRIPTION OF THE DRAWINGS

FIG. 1 is a generally schematic view an array of buried geophones connected to a surface seismic cable;

FIG. 2 is an enlarged sectional view of the geophone storage device for storing the geophone and geophone connector in a specific buried position and showing the geophone in operable relation; and FIG. 3 is an enlarged sectional view similar to FIG. 2, but showing the geophone device in a stored buried position at a specific location with an upper cap of a geophone device closing the end of a housing in water-tight relation for storing the geophone for future utilization.

DESCRIPTION OF THE INVENTION

Referring now particularly to FIG. 1, the earth or ground is shown at 10 having an upper ground surface 12. An opening 14 is drilled or formed in the earth to receive a geophone storage device or container generally indicated at 16. A seismic cable 18 extending along the ground 12 has a plurality of cable connectors 20 spaced along its length for releasable connection to geophone devices 16. Each cable connector 20 includes a prong 22 and a socket 24 for electrical connection to geophone device 16. Seismic cable 18 extends to a data processing and recording station.

A plurality of openings 14 are located in ground surface 12 at predetermined locations suitable for a survey and receive an array of geophone storage devices 16 therein. Geophone storage devices or containers 16 are located in opening 14 at a depth of between about three to four feet, for example, but may be positioned at any desired depth.

Referring now to FIGS. 2 and 3, the permanent geophone storage container 16 is illustrated. Geophone storage container 16 comprises an internally threaded lower generally cylindrical base 26, a tubular cylindrical body 28 having upper and lower external threads 30, and an upper cap 32 threaded onto body 28. Base 26, body 28, and cap 32 form a fluid tight container for a geophone and are preferably formed of metal with suitable elastomeric seals provided between base 26, body 28, and cap 32. Base 26 has a lower spike 34 extending therefrom for positioning and planting geophone storage device 16 within the earth opening 14.

Base 26 receives an annular bottom plate 36 defining a center opening 38 to receive and position a seismometer or geophone 40 therein. An insulating or potting compound 42 comprising an epoxy material is placed about geophone 40 and has a lower annular lip 44 gripped between bottom plate 36 and cylindrical body 28. A pair of insulated conductor wires 46 and 48 extend from a geophone coil and a cord knot 50 within potting compound 42 prevents tension from line 52 to be transmitted to geophone 40. Line 52 extends to geophone connector 54. Conductors 46 and 48 terminate at a prong 56 and a socket 58 in geophone connector 54. Connector 54 has a base 62 with an upper reduced diameter threaded end portion 59 receiving an upper removable cover 60 in a press tight fit to protect prong 56 and socket 58 when geophone 40 is not in use and in a stored position as shown in FIG. 3. A bayonet type lug arrangement may also be utilized for connecting cover 60 to base 62. An annular outer flange 64 on cover 60 may be gripped to remove cover 60 from base 62 for connection of geophone connector 54 in mating relation to cable connector 20. Also, a suitable retaining chain 61 may be connected between eyes 63 to retain cover 60 onto base 62. Storage container 16 of a length about eighteen (18) inches and a diameter of about two (2) inches has been satisfactory. A surface indicator, such as a colored pin or other metal marker, may be positioned on the ground surface to locate storage device 16 in a stored position. for use at a later time.

From the above, it is apparent that a seismic acquisition system and method has been provided in which an array of geophones positioned at precise positions may be easily stored within geophone storage devices 16 upon the completion of a survey. Then, a subsequent survey or shooting may be taken or conducted several months or a year later by repositioning of a surface seismic cable 18 and location of buried storage devices 16 from the surface indicators. Any earth is removed from the associated openings 14 by a suitable hand auger and upper caps 32 are removed from storage devices 16. Then, geophone connectors 54 may be lifted or withdrawn from storage containers 60 to a surface location. Covers 60 are then removed from geophone connectors 62 for mating with an associated cable connector 20 as shown in FIG. 1. Any predetermined number of surveys may be made with the array of geophones being in identical locations for each of the surveys conducted. Thus, any requirement for repositioning and replanting an array of geophones for subsequent surveys is eliminated by the present invention.

While a preferred embodiment of the present invention has been illustrated in detail, it is apparent that modifications and adaptions of the preferred embodiment will occur to those skilled in the art. However, it is to be expressly understood that such modifications are within the spirit and scope of the present invention as set forth in the following claims.

What is claimed is:

1. A method for conducting a plurality of seismic surveys at predetermined time intervals from an array of geophones buried at precise predetermined ground locations in geophone storage containers, each storage container having a removable cover and effective when not in use to store a geophone, an electrical lead from the geophone, and a geophone connector connected to the lead to permit removal of the geophone connector from the storage container; said method comprising the following steps:

providing a seismic cable having a plurality of cable connectors spaced along the length of the cable adjacent the geophone storage containers;

providing mating electrical prongs and sockets on said cable connectors and geophone connectors for removably connecting said cable connectors and geophone connectors;

transmitting seismic signals from said geophones to said seismic cable for conducting the survey;

disconnecting said mating prongs and sockets on said geophone connectors and said cable connectors upon completion of the survey;

storing the geophone, the electrical lead, and the geophone connector within an associated geophone storage container;

mounting the cover on the geophone storage container;

then, after a predetermined time period, conducting another seismic survey including the following steps:

providing a seismic cable having a plurality of cable connectors spaced along the length of the cable adjacent the geophone storage containers;

removing the covers from the buried containers;

withdrawing the geophone connectors from the containers;

electrically connecting said mating electrical prongs and sockets on said geophone connectors and said cable connectors; and transmitting seismic signals from said geophones to said seismic cable for conducting another survey.

2. The method as set forth in claim 1 including the steps of:

providing a pair of electrical leads on an end of each geophone connector; and mounting a connector cover on said geophone connector over said electrical leads when said geophone connector is stored thereby to protect said electrical leads.

3. The method as set forth in claim 1 and including the steps of:

providing an electrical prong and socket on an end of each geophone connector; and mounting a cover on said geophone connector over said prong and socket.

4. A geophone storage container for storing a geophone at a buried earth location for use in a plurality of seismic surveys conducted at different time periods over several months or years; said geophone storage container comprising:

a tubular body having a removable cover thereon; and a geophone including an electrical lead and a geophone connector stored within said container when not in use with said cover removably mounted on said container; said geophone connector removed from said container and connected to a seismic cable when in use with said cover removed from said container.

5. A geophone storage container as set forth in claim 4 wherein said geophone connector has a body with a pair of electrical conductors thereon for removable connection to a seismic cable.

6. A geophone storage container as set forth in claim 4 wherein said container has a generally cylindrical body, and a base is removably connected to said body having said geophone mounted therein.

7. A geophone storage container as set forth in claim 6 wherein said geophone is encapsulated within an epoxy material and said lead extends from said geophone through said epoxy material.

8. A geophone storage container for storing a geophone at a buried earth location for use in a plurality of seismic surveys conducted at different time periods over several months or years; said geophone storage container comprising:

a tubular body having a removable cover thereon;

a geophone including an electrical lead and a geophone connector stored within said container with said cover removably mounted on said container; said geophone connector having a body with a pair of electrical conductors thereon and arranged for connection to a seismic cable when in use with said cover removed from said container; and a removable connector cover mounted on said connector body over said electrical conductors when said geophone is in a stored position.

9. A geophone storage container as set forth in claim 8 wherein said electrical conductors comprise a prong and a socket for connection to a mating cable connector on the seismic cable.

* * * * *